US011603415B2

United States Patent
Nakatani et al.

(10) Patent No.: US 11,603,415 B2
(45) Date of Patent: Mar. 14, 2023

(54) DRY SOLIDS OF ANIONICALLY MODIFIED CELLULOSE NANOFIBERS AND PROCESSES FOR PREPARING THEM

(71) Applicant: NIPPON PAPER INDUSTRIES CO., LTD., Tokyo (JP)

(72) Inventors: Takeshi Nakatani, Yamaguchi (JP); Koji Kimura, Yamaguchi (JP); Shinji Sato, Yamaguchi (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 15/111,676

(22) PCT Filed: Jan. 9, 2015

(86) PCT No.: PCT/JP2015/050512
§ 371 (c)(1),
(2) Date: Jul. 14, 2016

(87) PCT Pub. No.: WO2015/107995
PCT Pub. Date: Jul. 23, 2015

(65) Prior Publication Data
US 2016/0333116 A1 Nov. 17, 2016

(30) Foreign Application Priority Data
Jan. 17, 2014 (JP) ................. 2014-006445

(51) Int. Cl.
| C08B 3/06 | (2006.01) |
| C08B 15/04 | (2006.01) |
| C08L 1/26 | (2006.01) |
| C08B 11/12 | (2006.01) |
| C08L 1/02 | (2006.01) |
| B05D 3/00 | (2006.01) |

(52) U.S. Cl.
CPC ................ *C08B 3/06* (2013.01); *B05D 3/007* (2013.01); *C08B 11/12* (2013.01); *C08B 15/04* (2013.01); *C08L 1/02* (2013.01); *C08L 1/26* (2013.01)

(58) Field of Classification Search
CPC ........... C08B 11/12; C08B 15/00; C08B 3/06; B05D 3/00
USPC ......................................................... 536/98
See application file for complete search history.

(56) References Cited

U.S. PATENT DOCUMENTS

| 4,588,500 | A * | 5/1986 | Sprenger | ............ | B01D 17/0202 |
| | | | | | 210/100 |
| 8,377,563 | B2 * | 2/2013 | Miyawaki | ................ | C08B 15/02 |
| | | | | | 427/324 |
| 9,181,653 | B2 * | 11/2015 | Paltakari | ................. | D21H 11/18 |

| 2009/0192264 | A1 * | 7/2009 | Laborie | .................. | B82Y 40/00 |
| | | | | | 525/54.21 |
| 2013/0022827 | A1 * | 1/2013 | Imai | ........................ | C08K 3/346 |
| | | | | | 428/446 |
| 2015/0027648 | A1 * | 1/2015 | Tsuji | ........................ | C08B 15/04 |
| | | | | | 162/24 |

FOREIGN PATENT DOCUMENTS

| CN | 1448427 | 10/2003 | |
| JP | 2008-106178 | 5/2008 | |
| JP | 2011-173993 | 9/2011 | |
| JP | 2012-041489 | 3/2012 | |
| JP | 2013-43963 | 3/2013 | |
| WO | WO 2010/066905 | 6/2010 | |
| WO | WO-2012120071 A1 * | 9/2012 | ............... D01D 1/02 |
| WO | WO 2013/031601 | 3/2013 | |
| WO | WO 2013/137140 | 9/2013 | |
| WO | WO 2014/181560 | 11/2014 | |

OTHER PUBLICATIONS

Yumiko et al (JP 2011173993 A, published Sep. 8, 2011, Machine Translated).*
Tsuji et al (WO 2013/137140 A1, Machine Translated).*
Kenta et al (JP 2012-041489 A, Machine Translated).*
Graveson et al, WO-2012120071-A1, Front Page, WO-2012120071-A1, Sep. 2012. (Year: 2012).*
International Search Report for PCT/JP2015/050512 dated Feb. 3, 2015, 4 pages.
Extended European Search Report issued in Appln. No. 15737161.8 dated Jul. 20, 2017.
Eyholzer, "Dried Nanofibrillated Cellulose and its Bionanocomposites," Doctoral Thesis, Jan. 1, 2011, XP055048720.
Eyholzer, "Dried Nanofibrillated Cellulose and its Bionanocomposites," Doctoral Thesis, Jan. 1, 2011, XP055048720, Paper I; Eyholzer et al., "Preparation and characterization of water redispersible nanofibrillated cellulose in powder form" *Cellulose*, vol. 17: 19-30 (2010).
Eyholzer, "Dried Nanofibrillated Cellulose and its Bionanocomposites," Doctoral Thesis, Jan. 1, 2011, XP055048720, Paper II; López-Suevos et al., "DMA analysis and wood bonding of PVAc latex reinforced with cellulose nanofibrils" *Cellulose*, vol. 17: 387-398 (2010).
Eyholzer, "Dried Nanofibrillated Cellulose and its Bionanocomposites," Doctoral Thesis, Jan. 1, 2011, XP055048720, Paper III; Eyholzer et al., "Reinforcing effect of carboxymethylated nanofibrillated cellulose powder on hydroxypropyl cellulose" *Cellulose*, 10 pages (May 8, 2010).
Eyholzer, "Dried Nanofibrillated Cellulose and its Bionanocomposites," Doctoral Thesis, Jan. 1, 2011, XP055048720, Paper IV; Borges et al. Nanofibrillated cellulose composite hydrogel for the replacement of the *nucleus pulposus*, pp. 1-31, Submitted to Acta Biomaterialia.

(Continued)

*Primary Examiner* — Leigh C Maier
*Assistant Examiner* — Everett White
(74) *Attorney, Agent, or Firm* — Nixon & Vanderhye P.C.

(57) ABSTRACT

Dry solids of anionically modified cellulose nanofibers with good redispersion are provided by incorporating 5 to 300% by mass of a water-soluble polymer relative to the anionically modified cellulose nanofibers during the preparation of the dry solids of anionically modified cellulose nanofibers.

3 Claims, No Drawings

(56) References Cited

OTHER PUBLICATIONS

Eyholzer, "Dried Nanofibrillated Cellulose and its Bionanocomposites," Doctoral Thesis, Jan. 1, 2011, XP055048720, Paper V; Eyholzer et al., Biocomposite hydrogels with carboxymethylated, nanofibrillated cellulose powder for replacement of the *nucleus pulposus*, pp. 1-24, Submitted to Biomacromolecules.

Eyholzer, "Dried Nanofibrillated Cellulose and its Bionanocomposites," Doctoral Thesis, Jan. 1, 2011, XP055048720, Paper VI; Eyholzer et al., "Esterification of carboxymethylated nanofibrillated cellulose with 1-hexanol for extrusion with polylactic acid" pp. 1-23, Submitted to Advanced Engineering Materials.

* cited by examiner

DRY SOLIDS OF ANIONICALLY MODIFIED
CELLULOSE NANOFIBERS AND
PROCESSES FOR PREPARING THEM

This application is the U.S. national phase of International Application No. PCT/JP2015/050512 filed 9 Jan. 2015 which designated the U.S. and claims priority to JP Patent No. 2014-006445 filed 17 Jan. 2014, the entire contents of each of which are hereby incorporated by reference.

TECHNICAL FIELD

The present invention relates to dry solid of anionically modified cellulose nanofibers.

BACKGROUND ART

Anionically modified cellulose nanofibers (CNFs) are fine fibers having a fiber diameter in the order of about 4 to several hundred nanometers with high dispersion in water systems so that they are expected to be applied for maintaining the viscosity of foods, cosmetics, medical products or coatings or the like; for strengthening dough and allowing it to retain water; for improving food stability; or for serving as low-calorie additives or emulsion stabilizing aids. Once the anionically modified CNFs dispersed in water (i.e., in the wet state) are dried into dry solids, they would not recover various properties such as solubility, dispersity, the degree of precipitation, and viscosity to levels comparable to those they exhibited before drying (i.e., in the wet state) even if one tried to redisperse the dry solids by adding water because hydrogen bonds are formed between the fine cellulose fibers. For this reason, the anionically modified CNFs have been prepared in the state where they are dispersed in water (in the wet state) and normally used in the wet state without being dried for various applications.

To stably maintain the anionically modified CNFs in the wet state, however, a several times to several hundred times greater mass of water is required relative to the anionically modified CNFs, which causes various problems such as a need for a large storage space, an increase in storage and shipping costs and the like. Some means for solving these problems have been proposed, including freeze-drying, critical point drying, drying after displacement with an organic solvent (patent document 1) and the like.

CITATION LIST

Patent Documents

Patent document 1: JPA No. 1994-233691.

SUMMARY OF INVENTION

Technical Problem

However, freeze-drying anionically modified CNFs requires enormous amounts of energy, and may cause problems such as growth of ice crystals larger than gaps between fine fibers of the anionically modified CNFs to result in mutual association of the fine fibers of the anionically modified CNFs when water freezes between the fine fibers under some conditions.

On the other hand, drying by solvent displacement requires a great amount of solvent and time because gaps between fine fibers of anionically modified CNFs are very small and a lot of water occurs on the surfaces of the fine cellulose fibers. In addition, the surfaces of the fine cellulose fibers of the anionically modified CNFs firmly adhere to each other via hydrogen bonds during the drying process of the solvent because water that cannot be displaced by the solvent remains. This makes it difficult for the anionically modified CNFs to restore the original state when they are redispersed.

Thus, the present invention aims to provide dry solids of anionically modified CNFs with good redispersion. The expression "good redispersion" means that the dry solids of anionically modified CNFs show little changes in their properties such as solubility and dispersity as well as the degree of precipitation, viscosity and transparency when they are dispersed, as compared with the anionically modified CNFs before drying.

Solution to Problem

The problems described above are solved by means including [1] to [6] below:
[1] A dry solid of an anionically modified cellulose nanofiber, comprising 5 to 300% by mass of a water-soluble polymer relative to the anionically modified cellulose nanofiber.
[2] The dry solid of an anionically modified cellulose nanofiber as defined in [1], wherein the anionically modified cellulose nanofiber is a carboxylated cellulose nanofiber having a carboxyl group content of 0.6 mmol/g to 2.0 mmol/g based on the bone dry mass of the anionically modified cellulose nanofiber.
[3] The dry solid of an anionically modified cellulose nanofiber as defined in [1], wherein the anionically modified cellulose nanofiber is a carboxymethylated cellulose nanofiber having a degree of carboxymethyl substitution of 0.01 to 0.50 per glucose unit of the anionically modified cellulose nanofiber.
[4] The dry solid of an anionically modified cellulose nanofiber as defined in any one of [1] to [3], wherein the water-soluble polymer is a carboxymethyl cellulose and a salt thereof.
[5] A process for preparing the dry solid of an anionically modified cellulose nanofiber as defined in any one of [1] to [4], comprising forming a thin film of an aqueous suspension containing the anionically modified cellulose nanofiber and a water-soluble polymer, and drying the thin film.
[6] A process for preparing the dry solid of an anionically modified cellulose nanofiber as defined in any one of [1] to [4], comprising adjusting an aqueous suspension containing the anionically modified cellulose nanofiber and a water-soluble polymer to pH 9 to 11, and then drying it.

Advantageous Effects of Invention

The present invention makes it possible to provide dry solids of anionically modified CNFs with good redispersion. The expression "good redispersion" means that the dry solids of anionically modified CNFs show little changes in their properties such as solubility and dispersity as well as the degree of precipitation, viscosity and transparency when they are dispersed, as compared with the anionically modified CNFs before drying.

DESCRIPTION OF EMBODIMENTS

The dry solids of anionically modified cellulose nanofibers of the present invention obtained by incorporating 5 to 300% by mass of a water-soluble polymer relative to the anionically modified CNFs are characterized in that they show little changes in their properties such as solubility, dispersity, the degree of precipitation, and viscosity when the solids are redispersed in water back into dispersions of the anionically modified CNFs in the wet state, as compared with the dispersions of the anionically modified CNFs in the wet state before drying (good redispersion).

The reason why the dry solids of anionically modified CNFs of the present invention exhibit excellent redispersion is not exactly known, but may be explained as follows: Anionically modified CNFs have electric charges on their surfaces so that they undergo electrostatic repulsion and stably exist in water while they are also redispersive to some extent when they are dried. However, the electric charges on the surfaces of the anionically modified CNFs are not homogeneous, and hydrogen bonds are formed to cause aggregation in regions with low charge density when drying, whereby sufficient redispersion cannot be achieved. If the anionically modified CNFs are combined with a water-soluble polymer, however, the water-soluble polymer covers the regions with low charge density on the surfaces of the anionically modified CNFs to prevent the formation of hydrogen bonds, whereby sufficient redispersion can be achieved.

As used herein, the term "dry solids of anionically modified cellulose nanofibers" refers to the anionically modified cellulose nanofibers dried to a moisture content of 12% by mass or less.

(Anionically Modified Cellulose Nanofibers)

As used herein, the term "anionically modified cellulose nanofibers (anionically modified CNFs)" refers to fine fibers having a fiber width of about 4 to 500 nm and an aspect ratio of 100 or more that call be obtained by defibrating an anionically modified cellulose such as a carboxylated cellulose (also referred to as oxidized cellulose), carboxymethylated cellulose, phosphate ester group-containing cellulose or the like.

(Cellulose Base Materials)

Cellulose base materials for preparing the anionically modified cellulose include, for example, those derived from plant materials (e.g., wood, bamboo, hemp, jute, kenaf, farm wastes, cloth, pulp (softwood unbleached kraft pulp (NUKP), softwood bleached kraft pulp (NBKP), hardwood unbleached kraft pulp (LUKP), hardwood bleached kraft pulp (LBKP), softwood unbleached sulfite pulp (NUSP), softwood bleached sulfite pulp (NBSP), thermomechanical pulp (TMP), recycled pulp, waste paper, etc.), animal materials (e.g., *Ascidiacea*), algae, microorganisms (e.g., acetic acid bacteria (*Acetobacter*)), microorganism-producing products and the like, and any of them can be used. Preferably used are cellulose fibers derived from plants or microorganisms, more preferably cellulose fibers derived from plants.

(Carboxymethylation)

When a carboxymethylated cellulose is used as an anionically modified cellulose in the present invention, the carboxymethylated cellulose may be obtained by carboxymethylating any one of the cellulose base materials listed above by a known method, or may be commercially available. In either case, it preferably has a degree of carboxymethyl substitution of 0.01 to 0.50 per anhydrous glucose unit of the cellulose. An example of a process for preparing such a carboxymethylated cellulose is as follows. A cellulose is used as a base material in a solvent consisting of water and/or a lower alcohol in an amount of 3 to 20 times the mass of the base material, specifically including water, methanol, ethanol, N-propyl alcohol, isopropyl alcohol, N-butanol, isobutanol, tert-butanol or the like alone or as a solvent mixture of two or more of them. When a mixture containing a lower alcohol is used, the proportion of the lower alcohol is 60 to 95% by mass. A mercerizing agent consisting of an alkali metal hydroxide is used in an amount of 0.5 to 20 molar equivalents per anhydrous glucose residue of the base material, specifically including sodium hydroxide or potassium hydroxide. The base material, solvent, and mercerizing agent are mixed to perform a mercerization process at a reaction temperature 0 to 70° C., preferably 10 to 60° C. for a reaction period of 15 minutes to 8 hours, preferably 30 minutes to 7 hours. Then, a carboxymethylating agent is added in an amount of 0.05 to 10.0 molar equivalents per glucose residue to perform an etherification reaction at a reaction temperature of 30 to 90° C., preferably 40 to 80° C. for a reaction period of 30 minutes to 10 hours, preferably 1 hour to 4 hours.

As used herein, the term "carboxymethylated cellulose" as a kind of anionically modified celluloses used for the preparation of anionically modified CNFs refers to the one that retains at least partially its fibrous morphology even when it is dispersed in water. Therefore, it is distinguished from carboxymethyl cellulose that is a kind of water-soluble polymers described herein later. When an aqueous dispersion of a "carboxymethylated cellulose" is analyzed by electron microscopy, fibrous substances can be observed. However, any fibrous substances are not observed in an aqueous dispersion of a carboxymethyl cellulose, which is a kind of water-soluble polymers. Moreover, peaks of type I cellulose crystals can be observed in a "carboxymethylated cellulose" by X-ray diffraction, but type I cellulose crystals cannot be found in a carboxymethyl cellulose used as a water-soluble polymer.

(Carboxylation)

When a carboxylated (oxidized) cellulose is used as an anionically modified cellulose in the present invention, the carboxylated cellulose (also referred to as oxidized cellulose) can be obtained by carboxylating (oxidizing) any one of the cellulose base materials by a known method. During the carboxylation, the carboxyl group content is preferably adjusted to, but not specifically limited to, 0.6 to 2.0 mmol/g, more preferably 1.0 mmol/g to 2.0 mmol/g based on the bone dry mass of the anionically modified cellulose nanofiber.

An example of a carboxylation (oxidation) method comprises oxidizing a cellulose base material using an oxidizing agent in water in the presence of a compound selected from the group consisting of an N oxyl compound, a bromide, an iodide or a mixture thereof. This oxidation reaction allows the primary hydroxyl group at the C6 position of the glucopyranose ring on the surface of the cellulose to be selectively oxidized to give a cellulose fiber having an aldehyde group and a carboxyl group (—COOH) or a carboxylate group (—COO$^-$) on its surface. During the reaction, the concentration of the cellulose is not specifically limited, but preferably 5% by mass or less.

The term "N-oxyl compound" refers to a compound capable of generating nitroxyl radicals. Any N-oxyl compounds can be used so far as they promote an intended oxidation reaction. For example, they include 2,2,6,6-tetramethylpiperidin-1-oxy radical (TEMPO) and derivatives thereof (e.g., 4-hydroxy-TEMPO).

The amount of the N-oxyl compound used is not specifically limited so far as it is a catalytic amount enough to oxidize the cellulose used as a base material. For example, it is preferably 0.01 to 10 mmol, more preferably 0.01 to 1 mmol, still more preferably 0.05 to 0.5 mmol per gram of bone dry cellulose. It is also preferably about 0.1 to 4 mmol/L relative to the reaction system.

The term "bromide" refers to a compound containing bromine, examples of which include alkali metal bromides that can be ionized by dissociation in water. Similarly, the term "iodide" refers to a compound containing iodine, examples of which include alkali metal iodides. The amount of the bromide or iodide used can be selected in a range that can promote the oxidation reaction. The total amount of the bromide and iodide is preferably, for example, 0.1 to 100 mmol, more preferably 0.1 to 10 mmol, still more preferably 0.5 to 5 mmol per gram of bone dry cellulose.

Any known oxidizing agents can be used, including, for example, halogens, hypohalous acids, halous acids, perhalic acids or salts thereof, halogen oxides, peroxides and the like. Among others, sodium hypochlorite is preferred because it is inexpensive and has a low environmental impact. The suitable amount of the oxidizing agent used is preferably 0.5 to 500 mmol, more preferably 0.5 to 50 mmol, still more preferably 1 to 25 mmol, most preferably 3 to 10 mmol per gram of bone dry cellulose, for example. It is also preferably 1 to 40 mol per mole of the N-oxyl compound, for example.

During the oxidation process of the cellulose, the reaction efficiently proceeds even under relatively mild conditions. Thus, the reaction temperature is preferably 4 to 40° C., or may be room temperature around 15 to 30° C. As the reaction proceeds, the pH of the reaction solution is found to decrease because carboxyl groups are generated in the cellulose. To ensure that the oxidation reaction efficiently proceeds, an alkaline solution such as an aqueous sodium hydroxide solution is preferably added to maintain the pH of the reaction solution in the order of 8 to 12, preferably 10 to 11. The reaction medium is preferably water because of easy handling, low likelihood of side reactions and the like.

The reaction period in the oxidation reaction can be appropriately selected depending on the extent to which oxidation proceeds, typically in the order of 0.5 to 6 hours, for example, 0.5 to 4 hours.

In addition, the oxidation reaction may be performed in two stages. For example, the oxidized cellulose obtained by filtration after the termination of a first stage reaction can be oxidized again under the same or different reaction conditions so that efficient oxidation can be achieved while preventing the reaction from being inhibited by sodium chloride produced as a by-product during the first stage reaction.

Another example of a carboxylation (oxidation) method may comprise contacting a cellulose base material with an ozone-containing gas. This oxidation reaction allows the hydroxyl groups at least at the 2- and 6-positions of the glucopyranose ring to be oxidized and the cellulose chain to be cleaved. The ozone concentration in the ozone-containing gas is preferably 50 to 250 g/m$^3$, more preferably 50 to 220 g/m$^3$. The amount of ozone to be added to the cellulose base material is preferably 0.1 to 30 parts by mass, more preferably 5 to 30 parts by mass per 100 parts by mass of the solids content of the cellulose base material. The ozonation temperature is preferably 0 to 50° C., more preferably 20 to 50° C. The ozonation period is not specifically limited, but in the order of 1 to 360 minutes, preferably 30 to 360 minutes. If the ozonation conditions are within these ranges, the cellulose can be prevented from excessively oxidized and cleaved and an oxidized cellulose can be obtained with good yield. The ozonation may be followed by a post-oxidation using an oxidizing agent. The oxidizing agent used for the post-oxidation is not specifically limited, but may include chlorine compounds such as chlorine dioxide and sodium chlorite; and oxygen, hydrogen peroxide, persulfuric acid, peracetic acid and the like. For example, a post-oxidation can be performed by dissolving one of these oxidizing agents in water or a polar organic solvent such as an alcohol to prepare a solution of the oxidizing agent and immersing the cellulose base material in the solution.

The carboxyl group content of the oxidized cellulose can be adjusted by controlling the reaction conditions such as the amount of the oxidizing agent added, the reaction period and the like described above.

(Defibration)

Equipment that can be used for defibrating the anionically modified cellulose may include, but not specifically limited to, high speed rotary machines, colloid mill machines, high pressure machines, roll mill machines, ultrasonic machines and the like. During the defibration, a high shear force should preferably be applied to an aqueous dispersion of the anionically modified cellulose. Especially for efficient defibration, a wet type high pressure or ultra-high pressure homogenizer capable of applying a pressure of 50 MPa or more and a high shear force to the aqueous dispersion should preferably be used. The pressure is more preferably 100 MPa or more, still more preferably 140 MPa or more. If desired, the aqueous dispersion may be pretreated by using known mixing, stirring, emulsifying or dispersing equipment such as a high speed shear mixer prior to the defibration and dispersion process in the high pressure homogenizer.

(Water-Soluble Polymers)

Water-soluble polymers that can be used in the present invention include, for example, cellulose derivatives (carboxymethyl cellulose, methyl cellulose, hydroxypropyl cellulose, ethyl cellulose), xanthan gum, xyloglucan, dextrin, dextran, carrageenan, locust bean gum, alginic acid, alginates, pullulan, starches, potato starch, arrowroot starch, processed starches (cationized starch, monostarch phosphate, distarch phosphate, phosphated distarch phosphate, hythoxypropyl starch, hydroxypropyl distarch phosphate, acetylated distarch adipate, acetylated distarch phosphate, acetylated oxidized starch, starch sodium octenylsuccinate, starch acetate, oxidized starch), corn starch, gum arabic, locust bean gum, gellan gum, polydextrose, pectin, chitin, water-soluble chitin, chitosan, casein, albumin, soy protein hydrolysate, peptone, polyvinyl alcohol, polyacrylamide, sodium polyacrylate, polyvinylpyrrolidone, polyvinyl acetate, polyamino acids, polylactic acid, polymalic acid, polyglycerin, latex, rosin sizing agents, petroleum resin sizing agents, urea resins, melamine resins, epoxy resins, polyamide resins, polyamide-polyamine resins, polyethyleneimines, polyamines, plant gums, polyethylene oxide, hydrophilic crosslinked polymers, polyacrylates, starch-polyacrylate copolymers, tamarind gum, guar gum and colloidal silica and mixtures of one or more of them. Among them, cellulose derivatives are preferred because of their compatibility for anionically modified cellulose nanofibers, among which especially preferred are carboxymethyl celluloses and salts thereof. Water-soluble polymers such as carboxymethyl celluloses and salts thereof are thought to improve redispersion by entering between anionically modified cellulose nanofibers to expand the distance between the CNFs.

When a carboxymethyl cellulose or a salt thereof is used as a water-soluble polymer, the carboxymethyl cellulose preferably has a degree of carboxymethyl substitution of 0.55 to 1.6, more preferably 0.55 to 1.1, still more preferably 0.65 to 1.1 per anhydrous glucose unit. In addition, it preferably has a longer molecular length (a higher viscosity) to more effectively expand the distance between CNFs, and therefore, it preferably has a Brookfield viscosity of 3 to 14000 mPa·s, more preferably 7 to 14000 mPa·s, still more preferably 1000 to 8000 mPa·s in a 1% by mass aqueous solution of the carboxymethyl cellulose at 25° C., 600 rpm.

The amount of the water-soluble polymer added is 5 to 300% by mass, preferably 20 to 300% by mass relative to the anionically modified CNF (bone dry solids). If it is less than 5% by mass, sufficient redispersion cannot be achieved, but if it exceeds 300% by mass, characteristic features of anionically modified CNFs including viscosity characteristics such as thixotropy and dispersion stability are impaired.

The amount of the water-soluble polymer added is preferably 25% by mass or more because especially excellent redispersion can be achieved. In terms of thixotropy, it is preferably 200% by mass or less, especially preferably 60% by mass or less.

(Processes for Preparing the Dry Solids)

The dry solids of anionically modified cellulose nanofibers with good redispersion can be obtained by drying an aqueous suspension containing an anionically modified cellulose nanofiber and a water-soluble polymer. Here, drying preferably takes place after the pH is adjusted 9 to 11, because dry solid of anionically modified cellulose nanofibers with more improved redispersion can be obtained.

(Drying Methods)

Known drying methods can be used, including, for example, spray drying, squeezing, air drying, hot air drying, and vacuum drying. Dryers that can be used include, but not specifically limited to, continuous tunnel dryers, band dryers, vertical dryers, vertical turbo dryers, multistage disc dryers, ventilation dryers, rotary dryers, pneumatic conveying dryers, spray dryers, atomizing dryers, cylinder dryers, drum dryers, belt dryers, screw conveyor dryers, rotary dryers with heating tubes, oscillating conveyor dryers, batch tray dryers, ventilation dryers, vacuum tray dryers, and agitated dryers and the like, and they can be used alone or as a combination of two or more of them.

Among them, dryers by which a thin film is formed and dried are preferably used in terms of energy efficiency because heat energy can be directly and uniformly supplied to an object to be dried so that drying can take place more efficiently and rapidly. Such dryers by which a thin film is formed and dried are also preferred because the dried object can be immediately collected by simple means such as scraping off the thin film. Moreover, it was found that redispersion is further improved when a thin film is formed once and dried. Examples of dryers by which a thin film is formed and dried include, for example, drum dryers and belt dryers by which a thin film is formed on a drum or a belt by a blade or a die or the like and then dried.

The thin film to be dried preferably has a thickness of 50 to 1000 μm, more preferably 100 to 300 μm. Thin films having a thickness of 50 μm or more are easily scraped off after drying, and those having a thickness of 1000 μm or less exhibit further improved redispersion.

(Dry Solids of Anionically Modified CNFs)

The dry solids of anionically modified CNFs of the present invention can be used as additives in various fields generally using additives such as foods, beverages, personal care products, cosmetics, medicaments, various chemical products, papermaking, civil construction, coatings, inks, coating compositions, agrochemicals, architecture, automobiles, chemicals for epidemic control, electronic materials, batteries, flame retardants, heat insulating materials, household goods, cleaning agents, water treatment, drilling fluids, neutral functional materials, spill control and/or recovery of shale gas and oil. Specifically, they can be used as thickeners, gelling agents, glues, food additives, excipients, reinforcing materials for rubbers and plastics, additives for coatings, additives for adhesives, additives for papermaking, polishing agents, water absorbing materials, deodorants, rust inhibitors, water retention agents, moisturizing agents, refrigerating agents, structuring agents, mud rheology modifier, filter aids and mud overflow inhibitors and the like, and further can be applied in rubber/plastic materials, coatings, adhesives, coatings for coated papers, coated papers, binders, cosmetics, lubricating compositions, polishing compositions, wrinkle reducers for clothing, gliding agents for ironing and the like containing these agents as components.

The dry solids of anionically modified CNFs of the present invention have desirable rheological properties, specifically thixotropy, desirable yield stress, reversible gelation, i.e., the property of returning to gels by still standing even if a shear force is applied, and temperature-insensitive elasticity so that they can preferably be used for applications taking advantages of these characteristics.

In food applications, the dry solids of anionically modified CNFs of the present invention can be used as, for example, rheology modifiers. For example, they can be used as stabilizers against creaming or precipitation in suspensions, or as indigestible dietary fibers.

In personal care products and household products, the dry solids of anionically modified CNFs can be used, for example, for stabilizing emulsions, suspensions, dispersions and foams. For example, they can be used in creams, lotions and gels for application to the skin; sunscreens; cleaning soaps or gels; antiperspirants and deodorants in the form of sticks, pump sprays, aerosols or roll-ons; fragrance release gels; lip colors, lip glosses, liquid cosmetic products; toothpastes, tooth cleaning agents; oral care products such as denture care products including whitening agents, cleansers and adhesives; controlled-release, sustained-release or delayed-release products; ointments, anesthetics, preservatives; wound care products such as dressings; absorbent products such as diapers; bleaching agents; shampoos; air cleaning agents; cleaning agents in the form of liquids, gels, pastes and foams (detergents, spot cleaners, softeners, etc.); aqueous or gel-like toilet bowl cleaners and the like.

In medical applications, the dry solids of anionically modified CNFs can be used as, for example, agents for controlling, sustaining or delaying the release of drugs. They can also be used as disintegrants for tablets, dietary fibers, liquid retention agents in wound care products and the like, as well as rheology modifiers.

In papermaking and film coating processes, the dry solids of anionically modified CNFs of the present invention can be used as emulsion modifiers, stabilizers, sizing agents, component separation inhibitors, component precipitation inhibitors, clarifying agents, absorbents, drainage aids, molding aids, flocculation aids, deposit or scale inhibitors, water treatment agents, dewatering agents, film- and skin-forming aids, crosslinking agents for polymer electrolytes, additives for eliminating hazardous substances, paper coating agents, hardness improvers, wet strength improvers, odor absorption improvers, flexibility improvers, strength improvers, tear resistance improvers, gas barrier improvers, and bending resistance improvers and the like.

In papermaking, scale control refers to the inhibition of deposition of calcium carbonate and calcium oxalate formed during pulping. Scale control can be achieved by dispersing salt crystals in media, or by inhibiting nucleation, or by inhibiting the formation of crystals that will be deposited.

The anionically modified cellulose nanofibers having a very small size and stabilized by introducing functional groups seem to help inhibit the growth of crystals that will be deposited and thereby inhibit scale deposition.

The dry solids of anionically modified CNFs can also be used in papermaking machines to increase the drainage and/or dewatering speed during papermaking; to retain dispersed organic and/inorganic particles (such as pulp powder, fillers, sizing agents, dyes, and/or clay); to retain hazardous organic and inorganic particulate matters; to improve the uniformity of paper sheets formed; and to improve the strength of paper sheets. Drainage aids are additives for increasing the speed at which water is drained from paper slurry on papermaking machines. Such additives allow rapider paper formation and therefore increase profitability. The anionically modified cellulose nanofibers have the function of increasing the drainage speed.

The dry solids of anionically modified CNFs can also be used to control the flow of color coatings, and to provide water retention properties so that they can be used in the field of coated paper. This allows the amount of water penetration into base paper to be controlled.

In coating compositions such as coatings and inks, the dry solids of anionically modified CNFs can be used as rheology modifiers, anti-splash agents, leveling agents, anti-drip agents, water penetration resistance improvers, dispersants and the like. Especially, they are useful for gel coatings. In inks such as inkjet printing inks, they can be used as dye dispersants and/or stabilizers, charge control agents, or flow control agents.

In the field of water treatment, the dry solids of anionically modified CNFs can be used as scale control agents, i.e., inhibitors against formation and/or increase of inorganic deposits in aqueous systems, clarifying agents, flocculation aids, precipitants, flocculants, charge transfer agents, and softeners.

In drilling fluids, the dry solids of anionically modified CNFs can be used as rheology modifiers to confer thixotropy on drilling fluids so that they have low viscosity during cutting but otherwise high viscosity. This reduces loss of drilling fluids and facilitates recovery of used drilling fluids.

In agricultural applications, the dry solids of anionically modified CNFs of the present invention can be used for soil treatment so that they can confer water retention, corrosion resistance, and freeze resistance on the soil. They can also be used as agents for controlled release, sustained release or delayed release of agrochemicals such as fertilizers, insecticides, fungicides and herbicides. They can also be used as crop protection agents for minimizing or preventing frost damage.

In the field of architecture, the dry solids of anionically modified CNFs can be used in concrete dispersants, drywall mud, reinforcing materials in construction caulks, water-soluble adhesives, and board making.

In the field of reinforcing materials, the dry solids of anionically modified CNFs can be used in rubbers (NR, SBR, EPDM, NBR, etc.) and plastics (polyolefin resins, acrylic resins, urethane resins, PVC resins, polyamide resins and PC resins, etc.).

EXAMPLES

The following examples further illustrate the present invention without, however, limiting the present invention thereto.

<Preparation of a Carboxylated (TEMPO-Oxidized) CNF>

To 500 ml of an aqueous solution of 780 mg of TEMPO (from Sigma Aldrich) and 75.5 g of sodium bromide dissolved therein was added 500 g (bone dry) of an unbeaten softwood bleached kraft pulp (brightness 85%), and the mixture was stirred until the pulp was homogeneously dispersed. An aqueous sodium hypochlorite solution was added to the reaction system in an amount of 6.0 mmol/g to start an oxidation reaction. During the reaction, the pH in the system decreased, and a 3M aqueous sodium hydroxide solution was sequentially added to adjust the reaction system to pH 10. The reaction was terminated when sodium hypochlorite has been consumed and the pH in the system showed no change. After the reaction, the mixture was filtered through a glass filter to separate the pulp, and the pulp was thoroughly washed with water to give an oxidized pulp (carboxylated cellulose). The pulp yield was 90%, the time required for the oxidation reaction was 90 minutes, and the carboxyl group content was 1.6 mmol/g.

The oxidized pulp obtained in the process described above was adjusted to 1.0% (w/v) with water, and treated in a ultra-high pressure homogenizer (20° C., 150 Mpa) for three cycles to give an anionically modified cellulose nanofiber dispersion. The resulting fiber had an average fiber diameter of 40 nm and an aspect ratio of 150.

<Determination Method of the Carboxyl Group Content>

Sixty ml of a 0.5% by mass slurry (aqueous dispersion) of the carboxylated cellulose was prepared and adjusted to pH 2.5 by adding a 0.1 M aqueous hydrochloric acid solution, and then a 0.05 N aqueous sodium hydroxide solution was added dropwise while the electric conductivity was measured until the pH reached 11, and the carboxyl group content was calculated from the amount of sodium hydroxide (a) consumed during the neutralization stage of the weak acid characterized by a slow change in electric conductivity by the equation below:

$$\text{Carboxyl group content[mmol/g carboxylated cellulose]} = a[\text{ml}] \times 0.05 / \text{mass[g] of carboxylated cellulose}.$$

<Preparation of a Carboxymethylated (CM) CNF>

In a stirrer capable of mixing pulp, 200 g of a pulp (NBKP (softwood bleached kraft pulp), from Nippon Paper Industries Co., Ltd.) on a dry mass basis and 111 g of sodium hydroxide on a dry mass basis were added and water was added in such an amount that the pulp had a solids content of 20% (w/v). Then, the mixture was stirred at 30° C. for 30 minutes, and then 216 g (on an active matter basis) of sodium monochloroacetate was added. The mixture was stirred for 30 minutes, and then warmed to 70° C. and stirred for 1 hour. Then, the reaction mixture was removed and neutralized and washed to give a carboxymethylated pulp having a degree of carboxymethyl substitution of 0.25 per glucose unit. Then, the carboxymethylated pulp was adjusted to a solids content of 1% with water, and defibrated by 5 treatment cycles in a high pressure homogenizer at 20° C., 150 MPa to give a carboxymethylated cellulose fiber. The resulting fiber had an average fiber diameter of 50 nm and an aspect ratio of 120.

<Determination Method of the Degree of Carboxymethyl Substitution Per Glucose Unit>

Precisely weighed about 2.0 g of the carboxymethylated cellulose fiber (bone dry) was added into a 300-mL Erlenmeyer flask with a ground glass stopper. To this was added 100 mL of a mixture of 100 mL of special grade concentrated nitric acid in 1000 mL of nitric acid-methanol, and the mixture was agitated for 3 hours to convert the carboxymethyl cellulose salt (CM cellulose.) into a hydrogen-substituted CM cellulose. Precisely weighed 1.5 to 2.0 g of the hydrogen-substituted CM cellulose (bone dry) was added into a 300-mL Erlenmeyer flask with a ground glass stopper. The hydrogen-substituted CM cellulose was wetted with 15 mL of 80% methanol, and 100 mL of 0.1N NaOH was added, and the mixture was agitated at room temperature for 3 hours. Using phenolphthalein as an indicator, the excess of NaOH was back-titrated with 0.1N H$_2$SO$_4$. The degree of carboxymethyl substitution (DS) was calculated by the equation below:

$$A=[(100\times F'-(0.1N\ H_2SO_4)(mL)\times F)\times 0.1]/(\text{bone dry mass(g) of hydrogen-substituted CM cellulose})$$

$$DS=0.162\times A/(1-0.058\times A)$$

A: the amount of 1N NaOH (mL) required for neutralizing 1 g of the hydrogen-substituted CM cellulose
F': the factor of 0.1N H$_2$SO$_4$
F: the factor of 0.1N NaOH.

<Determination Methods of the Average Fiber Diameter and Aspect Ratio>

Randomly chosen 200 fibers of the anionically modified CNFs were analyzed for their average fiber diameter and average fiber length using a field emission scanning electron microscope (FE-SEM). It should be noted that the aspect ratio was calculated by the equation below:

$$\text{Aspect ratio}=\text{average fiber length/average fiber diameter.}$$

Example 1

<Preparation of a Dry Solid>

The carboxylated CNF described above (carboxyl group content: 1.6 mmol/g; average fiber diameter: 40 nm; aspect ratio: 150) was used as an anionically modified CNF, To a 0.7% by mass aqueous auspensiun of the anionically modified CNF was added a carboxymethyl cellulose (available under the brand name F350HC-4 having a viscosity of about 3000 mPa·s (1%, 25° C.), and a degree of carboxymethyl substitution of about 0.9) in an amount of 40% by mass relative to the anionically modified CNF (i.e., in such an amount that the carboxymethyl cellulose had a solids content of 4U parts by mass per 100 parts by mass of the solids content of the anionically modified CNF), and the mixture was stirred by using T.K. HOMO MIXER (12,000 rpm) for 60 minutes to prepare an aqueous dispersion of the anionically modified CNF. This dispersion had a pH of about 7 to 8. This aqueous dispersion was adjusted to pH 9 by adding 0.5% of an aqueous sodium hydroxide solution, and then applied on the drum surface of the drum dryer D0405 (from KATSURAGI INDUSTRY CO. LTD.) to form a thin film having a thickness of about 100 to 200 μm, and dried at a vapor pressure of 0.5 MPa·G and a drum rotation speed of 2 rpm to give a dry solid of the anionically modified CNF having a moisture content of 5% by mass <Redispersion of the Dry Solid>

Then, the dry solid obtained as described above was redispersed in water for the purpose of evaluating the redispersion of the dry solid. The redispersion was evaluated under two conditions using a high power disperser (vigorous stirring) and a low power disperser (mild stirring) to assess the extent of redispersion.

Water was added to the dry solid obtained as described above to prepare a 0.7% by mass aqueous suspension, which was then vigorously stirred using T.K. HOMO MIXER (12,000 rpm) for 60 minutes or mildly stirred using a propeller agitator (600 rpm) for 3 hours to give an aqueous dispersion/suspension of the anionically modified CNF redispersed therein.

<Evaluation of Dispersity>

The vigorously or mildly stirred aqueous dispersion/suspension of the anionically modified CNF was diluted to 0.1% and placed on a microscope slide and evaluated for whether undispersed gel particles were found when the microscope slide was inclined. Evaluation was made according to the following scoring criteria: 3: no visible particles; 2: visible particles; 1: most of particles were undispersed and separated from water.

<Determination of Viscosity>

The Brookfield viscosity of the aqueous dispersion/suspension of the anionically modified CNF (solids content 0.7%, 25° C.) was measured under conditions of a rotation speed of 30 rpm for 3 minutes.

<Determination of Transparency>

The transparency (light transmittance at 660 nm) of the aqueous dispersion/suspension of the anionically modified CNF (solids content 0.1%) was measured by using the UV spectrophotometer U-3000 (from Hitachi High-Technologies Corporation).

<Evaluation of Recovery Rates>

Changes in the viscosity and transparency of the dispersion/suspension before and after drying and redispersion were evaluated as the recovery rate of viscosity or transparency. The recovery rate was calculated by the equation below:

$$\text{Recovery rate (\%)}=(\text{viscosity or transparency of dispersion before drying})/(\text{viscosity or transparency of dispersion/suspension after redispersion})\times 100.$$

<Determination of the Thixotropy of the Dry Solid>

The Brookfield viscosity of the aqueous dispersion/suspension of the anionically modified CNF redispersed by vigorous stirring was measured immediately after stirring (rotation speed 30 rpm, 3 minutes) and after still standing for a day (rotation speed 30 rpm, 3 minutes), and the ratio between both values were evaluated according to the following scoring criteria: 4: the ratio was 2 or more; 3: the ratio was 1.5 or more and less than 2; 2; the ratio was more than 1 and less than 1.5; 1: the ratio was 1.

Example 2

The same procedure as described in Example 1 was performed except that the pH was adjusted to 8 in the preparation of the dry solid.

Example 3

The same procedure as described in Example 1 was performed except that the pH was adjusted to 11 in the preparation of the dry solid.

Example 4

The same procedure as described in Example 1 was performed except that the carboxymethyl cellulose was added in an amount of 100% by mass relative to the anionically modified CNF in the preparation of the dry solid.

Example 5

The same procedure as described in Example 1 was performed except that the CM CNF obtained as described above (degree of carboxymethyl substitution: 0.25; average fiber diameter: 50 nm; aspect ratio: 120) was used as an anionically modified CNF.

Example 6

The same procedure as described in Example 5 was performed except that the pH was adjusted to 8 in the preparation of the dry solid.

Example 7

The same procedure as described in Example 5 was performed except that the pH was adjusted to 11 in the preparation of the dry solid.

Examples 8 to 15

The same procedure as described in Example 5 was performed except that the carboxymethyl cellulose was added in an amount of 5, 20, 25, 65, 100, 150, 200, and 300% by mass relative to the anionically modified CNF in the preparation of the dry solid.

Example 16 to 18

The same procedures as described in Examples 5, 12, and 13 were performed except that a carboxymethyl cellulose available under the brand name F04HC having a viscosity of about 50 mPa·s (1%, 25° C.) and a carboxymethyl substitution degree of about 0.9 was used.

Example 19 to 21

The same procedures as described in Examples 5, 12, and 13 were performed except that a carboxymethyl cellulose available under the brand name FT-3 having a viscosity of about 30 mPa·s (1%, 25° C.) and a carboxymethyl substitution degree of about 0.9 was used.

Examples 22 and 23

The same procedure as described in Example 5 was performed except that polyvinyl alcohol (PVA) (KURARAY POVAL 105 from KURARAY CO., LTD.) and a starch (potato starch from Hokuren Group) were used respectively in place of the carboxymethyl cellulose.

Comparative Examples 1 and 2

The same procedures as described in Examples 5 and 6 were performed except that the carboxymethyl cellulose was not added in the preparation of the dry solid.

Comparative Example 3

The same procedure as described in Example 5 was performed except that the carboxymethyl cellulose was not added and the pH was not adjusted in the preparation of the dry solid.

The results are shown in Table 1.

TABLE 1

| | Base material | pH | Water-soluble polymer Type | Parts by mass | Dispersity Vigorous stirring | Mild stirring | Viscosity recovery % | Transparency recovery % | Thixotropy |
|---|---|---|---|---|---|---|---|---|---|
| Example 1 | TOCNF | 9 | CMC-1 | 40 | 3 | 2 | 11 | 100 | 3 |
| Example 2 | TOCNF | 8 | CMC-1 | 40 | 2 | 1 | 5 | 67 | 2 |
| Example 3 | TOCNF | 11 | CMC-1 | 40 | 3 | 2 | 10 | 92 | 3 |
| Example 4 | TOCNF | 11 | CMC-1 | 100 | 3 | 2 | 9 | 100 | 2 |
| Example 5 | CMCNF | 9 | CMC-1 | 40 | 3 | 2 | 54 | 98 | 4 |
| Example 6 | CMCNF | 8 | CMC-1 | 40 | 3 | 2 | 24 | 93 | 4 |
| Example 7 | CMCNF | 11 | CMC-1 | 40 | 3 | 2 | 49 | 98 | 4 |
| Example 8 | CMCNF | 9 | CMC-1 | 5 | 2 | 1 | 59 | 96 | 4 |
| Example 9 | CMCNF | 9 | CMC-1 | 20 | 2 | 2 | 58 | 97 | 4 |
| Example 10 | CMCNF | 9 | CMC-1 | 25 | 3 | 2 | 63 | 98 | 4 |
| Example 11 | CMCNF | 9 | CMC-1 | 65 | 3 | 2 | 64 | 100 | 3 |
| Example 12 | CMCNF | 9 | CMC-1 | 100 | 3 | 3 | 75 | 100 | 3 |
| Example 13 | CMCNF | 9 | CMC-1 | 150 | 3 | 3 | 100 | 100 | 3 |
| Example 14 | CMCNF | 9 | CMC-1 | 200 | 3 | 3 | 100 | 100 | 3 |
| Example 15 | CMCNF | 9 | CMC-1 | 300 | 3 | 3 | 100 | 100 | 2 |
| Example 16 | CMCNF | 9 | CMC-2 | 40 | 2 | 1 | 27 | 79 | 2 |
| Example 17 | CMCNF | 9 | CMC-2 | 100 | 3 | 2 | 40 | 81 | 2 |
| Example 18 | CMCNF | 9 | CMC-2 | 150 | 3 | 3 | 65 | 98 | 2 |
| Example 19 | CMCNF | 9 | CMC-3 | 40 | 2 | 1 | 40 | 77 | 2 |
| Example 20 | CMCNF | 9 | CMC-3 | 150 | 3 | 2 | 43 | 83 | 2 |
| Example 21 | CMCNF | 9 | CMC-3 | 100 | 3 | 3 | 70 | 83 | 2 |
| Example 22 | CMCNF | 9 | PVA | 40 | 2 | 2 | 32 | 91 | 3 |
| Example 23 | CMCNF | 9 | Starch | 40 | 2 | 1 | 19 | — | 3 |
| Comparative example 1 | CMCNF | 9 | None | | 1 | 1 | 11 | 100 | — |
| Comparative example 2 | CMCNF | 8 | None | | 1 | 1 | — | — | — |
| Comparative example 3 | CMCNF | 7 | None | | 1 | 1 | 10 | 83 | — |

It is apparent from the results shown in Table 1 that redispersion improves when dry solids of anionically modified CNFs are combined with water-soluble polymers.

The invention claimed is:

1. A process for preparing a dry solid of a mixture of an anionically modified cellulose nanofiber and a water-soluble polymer, comprising 5 to 60% by mass of the water-soluble polymer relative to the anionically modified cellulose nanofiber, wherein the anionically modified cellulose nanofiber comprises an anion group obtained by oxidizing a hydroxyl group of a glucopyranose ring of the cellulose, or an anion group obtained by binding a hydroxyl group of a glucopyranose ring of the cellulose with an anion group via an ether bond or an ester bond, wherein a moisture content of the dry solid is 12% by mass or less, the process comprising:

forming a film of an aqueous suspension containing the anionically modified cellulose nanofiber and the water-soluble polymer on a drum of a drum dryer or a belt of a belt dryer, wherein the film has a thickness of 50 to 1000 µm;

supplying heat energy to the film to dry the film, and scraping the dried film on the drum or the belt off to obtain the dry solid.

2. The process according to claim 1, wherein the thickness of the dried film is 100 to 300 µm.

3. A process for preparing a dry solid of a mixture of an anionically modified cellulose nanofiber and a water-soluble polymer, comprising 5 to 60% by mass of the water-soluble polymer relative to the anionically modified cellulose nanofiber, wherein the anionically modified cellulose nanofiber comprises an anion group obtained by oxidizing a hydroxyl group of a glucopyranose ring of the cellulose, or an anion group obtained by binding a hydroxyl group of a glucopyranose ring of the cellulose with an anion group via an ether bond or an ester bond, wherein a moisture content of the dry solid is 12% by mass or less, the process comprising:

adjusting an aqueous suspension containing the anionically modified cellulose nanofiber and the water-soluble polymer to pH 9 to 11; and then drying the aqueous suspension.

* * * * *